United States Patent [19]

Schubert

[11] 3,929,349
[45] Dec. 30, 1975

[54] PROTECTIVE DEVICE FOR VEHICLES
[76] Inventor: Emil Georg Schubert, 4210 Kenyon Ave., Los Angeles, Calif. 90066
[22] Filed: Sept. 30, 1974
[21] Appl. No.: 510,482

[52] U.S. Cl............................. 280/150 B; 297/390
[51] Int. Cl.² ........................................... B60R 21/02
[58] Field of Search................ 280/150 SB, 150 B; 296/84 K; 297/384, 390

[56] References Cited
UNITED STATES PATENTS

| | | | |
|---|---|---|---|
| 2,661,221 | 12/1953 | Lockwood et al. | 280/150 B |
| 3,133,746 | 5/1964 | Zazzara | 280/150 B |
| 3,279,817 | 10/1966 | Henry | 280/150 B |
| 3,722,951 | 3/1973 | Ezquerra | 280/150 SB |
| 3,819,197 | 6/1974 | Shakespear | 280/150 B |

*Primary Examiner*—M. Henson Wood, Jr.
*Assistant Examiner*—Michael J. Forman
*Attorney, Agent, or Firm*—Ralph B. Pastoriza

[57] ABSTRACT

Protective cushions are cantilevered from the underside of the roof of a vehicle in a raised position which will block the line of sight of an occupant driver of the vehicle out the front of the vehicle. The lower portions of the cushions include channels through which the seat belt of the vehicle can be passed when the cushions are pulled down in front of an occupant, the seat belt holding the cushions in a protective position in front of the occupant and also in a position out of the line of sight of the occupant so that he can properly operate the vehicle when the protective device is in its protective position. Release of the seat belt automatically results in the device being biased upwardly to its unused position wherein the line of sight of the occupant is blocked. A vehicle operator must therefore properly position the protective device before he can effectively operate the vehicle.

4 Claims, 4 Drawing Figures

PROTECTIVE DEVICE FOR VEHICLES

This invention relates to protective devices for vehicles and more particularly to a protective device designed to cooperate with a vehicle seat belt to provide improved protection of a vehicle occupant in the event of a crash.

BACKGROUND OF THE INVENTION

Seat belts for protecting drivers of vehicles are now well-established in the art and have proved very effective. However, there is still the problem of the upper portion of an occupant's body being hurtled forwardly notwithstanding the presence of a seat belt in the event of a crash.

To solve the foregoing problem, various types of shoulder harnesses have been proposed in addition to the conventional seat belt. More recently, air bags have also been proposed wherein a balloon-like bag will become automatically inflated in front of the driver in the event of a collision to protect his chest and face.

A problem associated both with shoulder harnesses and air bag type protective devices is that of assuring that a driver will utilize the same. Thus, while the buckling of a seat belt is a fairly simple operation and does not provide much of an aggravation to a driver, the additional annoyance of having to buckle a shoulder harness or foot the relatively large expense of having an air bag system installed in the vehicle has resulted in the driver simply in many instances not using the harness or air bag. One proposed remedy which has not been accepted without substantial criticism is to make it impossible to start the engine of the vehicle until shoulder harnesses, seat belts and the like are properly fastened to protect the occupant.

BRIEF DESCRIPTION OF THE PRESENT INVENTION

With the foregoing in mind, the present invention contemplates a vastly improved protective device for use in vehicles which will afford at least as trustworthy protection as a shoulder harness and/or air bag for substantially less expense and which must be properly utilized by a vehicle occupant if he is to drive the vehicle.

More particularly, the present invention contemplates the provision of a simple cushion means together with resilient means supporting the cushion means in the vehicle in a position blocking the normal line of sight of an occupant out the front of the vehicle when the cushion means is not being used to protect the occupant. A fastening means in turn is provided on the cushion means for securing the cushion means to the seat belt. Thus, the arrangement is such that the occupant can fold down the cushion means against the bias of the resilient means and fasten the cushion means to the seat belt so that the cushion means is in a protective position in front of the occupant below his line of sight so that he can see to operate the vehicle when the protective device is positioned to protect the occupant.

By making the cushion means of a substantially larger area than the width of a conventional shoulder harness, greater protection is provided. Moreover, since the protective device essentially blocks the line of vision of the occupant when not in use, it must be properly positioned and secured to the seat belt, the seat belt itself being fastened over the driver's lap in order that the driver can effectively operate the vehicle.

The overall expense of the foregoing type of arrangement is substantially less than that of air bags or other proposed devices and does not require any interconnection with the automobile engine to assure that a vehicle occupant will utilize the same.

BRIEF DESCRIPTION OF THE DRAWINGS

A better understanding of the present invention will be had by now referring to a preferred embodiment as illustrated in the accompanying drawings in which.

DETAILED DESCRIPTION OF THE PREFERRED EMBODIMENT

Figure 1:
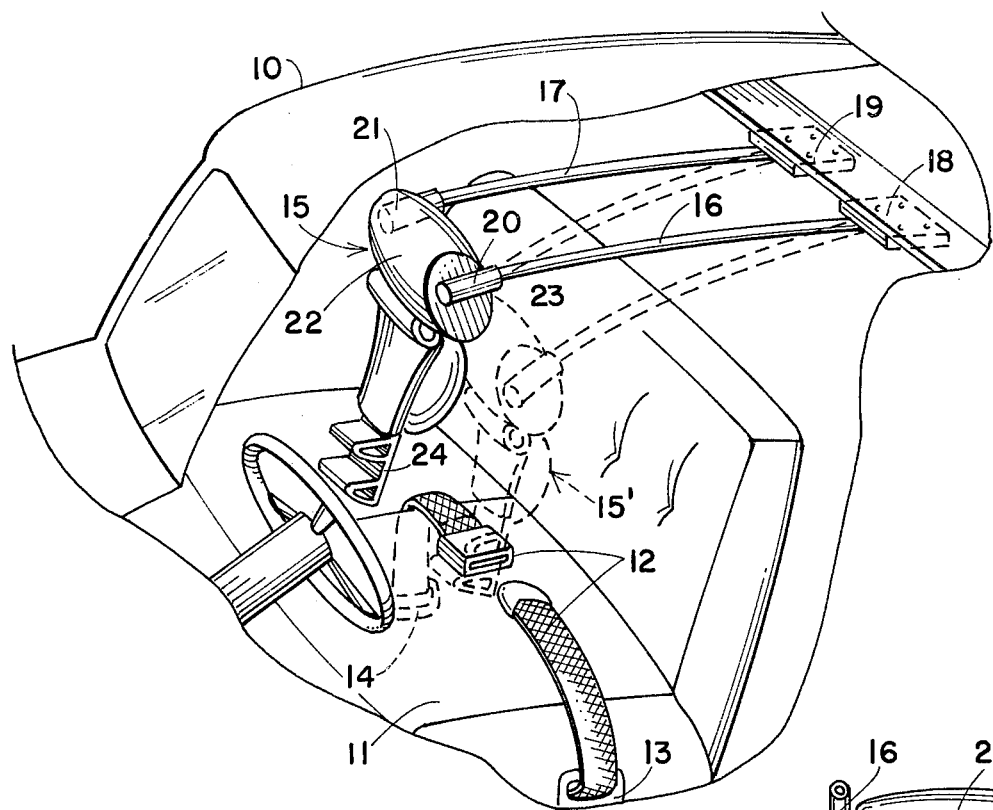
FIG. 1 is a broken away perspective view of a vehicle incorporating the protective device of the present invention.

Referring first to FIG. 1 there is shown a vehicle such as an automobile 10 having a seat 11 equipped with a normal seat belt 12. The seat belt 12, as shown, is securely anchored to the vehicle frame on either side of the vehicle seat as shown at 13 and 14.

The protective device of the present invention includes a cushion means designated generally by the numeral 15 supported by resilient means in the form of first and second resilient rods 16 and 17 having first ends 18 and 19 anchored to a given portion of the vehicle such as the underside of a cross frame member in the vehicle roof. The rods 16 and 17 thus extend in a generally horizontal direction adjacent to the underside of the roof in a cantilevered manner, their second ends being secured to the cushion means 15 as at 20 and 21.

In the particular embodiment illustrated, the cushion means 15 includes a head cushion 22 and a chest cushion 23 secured to the underside of the head cushion. In the particular embodiment illustrated, the second ends of the flexible rods 16 and 17 are secured to either side of the head cushion portion 22.

The cushion means is completed by the provision of channel means 24 secured to the underside of the chest cushion 23. The channel means 24 is arranged to receive the seat belt 12 when the protective device is placed in proper protective position in front of an occupant seated on the seat 11.

Figure 2:
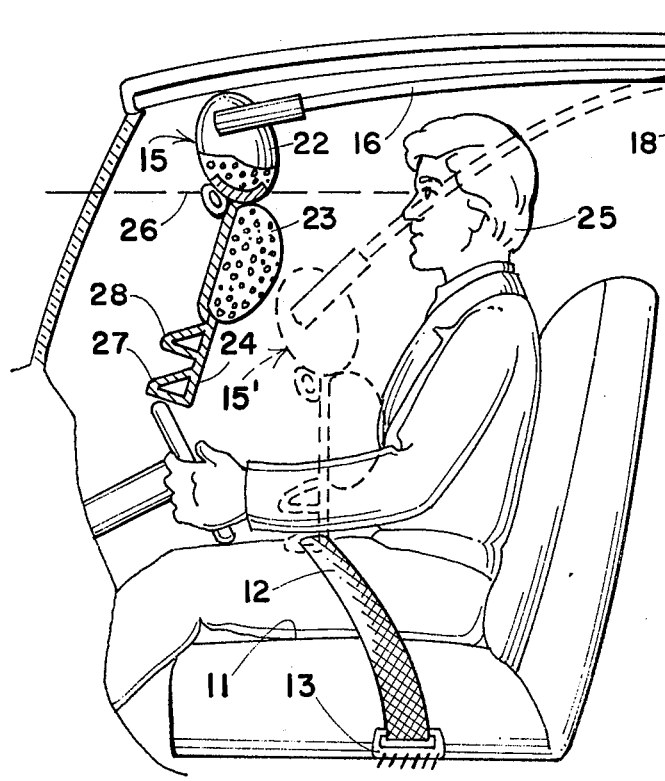
FIG. 2 is another broken away view in side elevation partly in cross section of the device of FIG. 1.

Referring particularly to FIG. 2, the foregoing will be evident wherein there is shown an occupant 25 seated on the seat 11. When the protective device in the form of the cushions 22 and 23 is not being used, it is supported by the resilient means such as the rod 16 in a raised position such that the line of sight of the occupant 25 is blocked from out the front of the vehicle. This line of sight is indicated by the dashed line 26.

When the occupant 25 wishes to operate the vehicle, he must necessarily pull downwardly on the cushion means 15 to a position in front of him and in order to hold the cushion means in its protective position, he must pass the seat belt through the channel means 24.

The foregoing proper operative position of the protective means is illustrated in dotted lines at 15' wherein the seat belt 12 is shown passed through the channel means 24. In this protective position, it will be evident that the cushion means is no longer blocking the line of sight 26 of the occupant 25 so that he can properly operate the vehicle.

In the particular embodiment illustrated, it will be noted that the channel means 24 preferably defines first and second channels 27 and 28 spaced different vertical distances below the chest cushion 23. By this arrangement, either one or the other of the channels may be selected for passing the seat belt through thereby adjusting the relative vertical height of the protective device. The device can thus be properly adjusted in accord with the size of the occupant 25.

As an example of the foregoing, if a relatively short person or child were to use the protective device, the upper channel 28 would be used which would automatically position the cushions in a lower position relative to the occupant's head than would be the case were the lower channel 27 used for the seat belt.

It will also be evident from FIG. 2 that when the occupant unfastenes the seat belt, the resilient support for the cushion means will result in an automatic raising of the cushion means to the solid line position illustrated in FIG. 2 thereby blocking the line of sight of the occupant so that he cannot effectively operate the vehicle.

Figure 3:
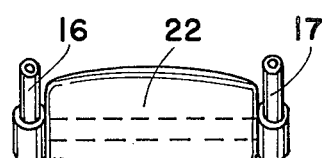
FIG. 3 is a fragmentary front elevational view of the protective device.

FIG. 3 illustrates the head and chest cushions 22 and 23 as would appear to the driver in front elevational view, the resilient rods 16 and 17 passing on either side of the occupant's head when the protective device is in operative position. In the showing of FIG. 3, the seat belt 12 has been passed through the lower channel 27 of the channel means 24.

Figure 4:
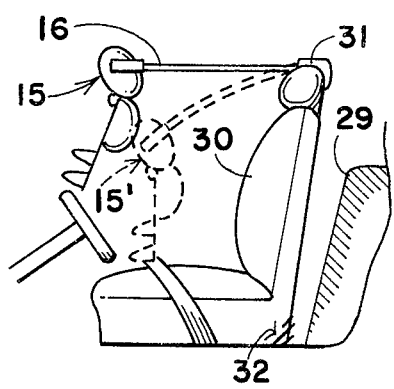
FIG. 4 is a side elevational view of the device when incorporated in a convertible type vehicle.

FIG. 4 illustrates diagramatically the manner in which the protective device may be used with a convertible automobile wherein should the top be down, the resilient supports could not be effectively anchored to the roof. As shown in FIG. 4, the resilient support in the form of the rods 16 and 17 are instead anchored at first ends adjacent to the back rest 30 of the vehicle seat such as close to the head rest 31. The seat back is anchored at 32 to the floor.

In the case of installation in a convertible, the resilient rods are properly positioned to support the cushion means to block the line of sight of the occupant when the same are not being used. As in the case described with respect to FIGS. 1, 2 and 3, an occupant will then simply pull the cushion means downwardly to the dotted line position shown in FIG. 4 and secure the seat belt as before so that his line of vision is unblocked when the protective device is in proper protective position.

The cushion means themselves in the form of the head cushion 22 and chest cushion 23 may be filled with any suitable cushioning material or, alternatively, may constitute air bags. By providing both a head cushion and chest cushion secured together as shown, an occupant is protected in a crash from damage to both his chest and head or face, the head cushion serving to cushion forward movement of the occupant's head.

It will be appreciated that the device as described can be manufactured relatively economically and easily installed. There is no requirement for any interconnection with the vehicle engine to assure that the occupant will use the device. Moreover, substantially no further effort is involved on the part of the occupant in properly utilizing the device than is involved in the normal fastening of his seat belt. It is only necessary that he pull the device down and pass the seat belt through a selected channel.

From the foregoing description, it will be evident that the present invention has provided an improved protective device for occupants of vehicles providing all the safety advantages of more sophisticated devices at substantially less expense and wherein it is always assured that the occupant will utilize the device if he is to effectively operate the vehicle.

What is claimed is:

1. A protective device for protecting an occupant of a vehicle equipped with a seat and seat belt, comprising, in combination:
    a. elongated resilient means secured to said vehicle and extending forwardly in a generally horizontal direction above the vehicle seat in a cantilevered fashion;
    b. a head cushion secured to the forward portion of the resilient means;
    c. a chest cushion secured to the underside of said head cushion; and
    d. first and second channels at different distances below said chest cushion secured to the underside of said chest cushion, either one of which may receive said seat belt, said resilient means supporting said head cushion and chest cushion when not in use being in a position in front of an occupant in said vehicle seat blocking his line of vision out the front of the vehicle, whereby the occupant can pull down on said protective device against the bias of said resilient means towards his front when seated and pass the seat belt through one of said channels and then fasten the same to thereby anchor said protective device in a proper protective position in front of him below his line of sight out the front of the vehicle, releasing of said seat belt permitting said protective device to be raised by said resilient means to a position blocking the occupant's line of sight from the front of the vehicle so that in order to see effectively to operate the vehicle a driver occupant must lower the protective device and anchor the same with said seat belt in its protective position, one or the other of said channels being selected for securement by said seat belt to provide an adjustment of the vertical height of said protective device in accord with the size of the vehicle occupant.

2. A protective device according to claim 1, in which said resilient means includes first and second resilient rods having first ends anchored to a given portion of the vehicle, and their second ends anchored on opposite sides of said head cushion, the rods being spaced apart such that they pass on either side of an occupant's head when said protective device is pulled down to its protective position.

3. A protective device according to claim 2, in which said vehicle has a roof; and in which said given portion of said vehicle constitutes the underside of said roof.

4. A protective device according to claim 2, in which said given portion constitutes the back of said seat, in said vehicle.

* * * * *